United States Patent
Lingener

(10) Patent No.: US 6,854,455 B2
(45) Date of Patent: Feb. 15, 2005

(54) ROTATION ANGLE DETECTOR, INJECTION SYSTEM AND CORRESPONDING OPERATING METHOD

(75) Inventor: Uwe Lingener, Magdebrug (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/381,943
(22) PCT Filed: Sep. 14, 2001
(86) PCT No.: PCT/DE01/03547
§ 371 (c)(1),
(2), (4) Date: Mar. 28, 2003
(87) PCT Pub. No.: WO02/27274
PCT Pub. Date: Apr. 4, 2002

(65) Prior Publication Data
US 2004/0094130 A1 May 20, 2004

(51) Int. Cl.$^7$ .............................. F02P 9/00; F02M 51/00
(52) U.S. Cl. ....................... 123/612; 123/630; 123/494; 123/406.6; 377/17
(58) Field of Search ................................ 123/478, 494, 123/406.6, 612, 630; 701/104, 105, 115; 377/17

(56) References Cited

U.S. PATENT DOCUMENTS

| | | | |
|---|---|---|---|
| 4,430,647 A | * 2/1984 | Moller | 340/679 |
| 4,827,886 A | 5/1989 | Maeda | 73/116 |
| 5,182,943 A | 2/1993 | Fukui et al. | 73/116 |
| 5,630,396 A | 5/1997 | Fukui et al. | 123/406.18 |
| 5,869,962 A | 2/1999 | Kasumi et al. | 324/207.21 |
| 5,929,789 A | * 7/1999 | Barbehenn | 341/11 |
| 6,100,823 A | * 8/2000 | Copper | 341/11 |
| 6,119,666 A | * 9/2000 | Fischer et al. | 123/617 |
| 6,396,052 B1 | * 5/2002 | Barry et al. | 250/231.13 |
| 6,410,909 B1 | * 6/2002 | Rudolph et al. | 250/231.13 |
| 6,655,187 B1 | * 12/2003 | Lehner et al. | 73/1.75 |

FOREIGN PATENT DOCUMENTS

| | | |
|---|---|---|
| DE | 4037546 | 5/1991 |
| DE | 4011503 | 10/1991 |
| DE | 19613598 | 10/1996 |
| DE | 19638386 | 3/1998 |
| DE | 19808744 | 5/1999 |

* cited by examiner

Primary Examiner—Hai Huynh
(74) Attorney, Agent, or Firm—Cohen, Pontani, Lieberman & Pavane

(57) ABSTRACT

A rotation angle detector for detecting the angular position of a shaft, i.e. a camshaft or a camshaft of an internal combustion engine, includes a rotatable detector wheel coupled to the shaft. Markings of a first type are distributed along a periphery of the detector wheel and are detectable by a sensor for determining a relative rational angle. Markings of a second type are also distributed over the periphery of the detector wheel. The markings of the second type are distinguishable from each other for determining an absolute rotational angle of the shaft or for determining selection of a combustion chamber for injection.

15 Claims, 4 Drawing Sheets

ROTATION ANGLE DETECTOR, INJECTION SYSTEM AND CORRESPONDING OPERATING METHOD

PRIORITY CLAIM

This is a national stage of PCT Application No. PCT/DE01/03547, filed on Sep. 14, 2001. Priority is claimed for that application and a corresponding application having been filed in Germany on Sep. 28, 2000, No. 100 48 169.8.

BACKGROUND OF THE INVENTION

1. Field of the Invention

The invention relates to a rotation angle detector for detecting the angular position of a shaft, especially a camshaft or crankshaft of an internal combustion engine comprising several combustion chambers, an injection system including the rotation angle detector and an operating method for the injection system.

2. Description of the Prior Art

The injection timing in internal combustion engines having an injection system is conventionally defined as a function of the angular position of the crankshaft. The steps of the injection process are not effected on every revolution for a given combustion chamber in the case of a four-stroke engine, however, so the phase position of the crankshaft must also be known in order to define the injection timing. It is therefore customary also to detect the angular position of the camshaft during the starting process of the internal combustion engine in order to derive therefrom the phase position of the crankshaft.

The fact that both the angular position of the camshaft and the angular position of the crankshaft have to be detected makes the procedure relatively complex and is thus a disadvantage of the known injection systems.

SUMMARY OF THE INVENTION

The object of the invention is accordingly to determine both the phase position and the angular position of the crankshaft and/or of the camshaft in an injection system in the simplest possible way.

The invention includes the general technical teaching of providing a rotation angle detector that makes it possible to determine both a relative angular position and an absolute angular position and/or a phase position of a rotating body.

The preferred embodiment thus includes a rotation angle detector having a rotatably mounted detector wheel which is mechanically coupled to a shaft such as, for example, a camshaft, a crankshaft or some other shaft, the angular position of which shaft is to be detected. Spread over the periphery of the detector wheel here are numerous markings of a first type that can be detected by a sensor and enable a relative determination of the rotation angle. The markings of the first type are preferably in an evenly spaced arrangement and of a uniform design. The detector wheel may, for example, be realized as a toothed wheel with each tooth constituting a marking of the first type.

Also spread over the periphery of the detector wheel are several markings of a second type, which markings can be detected by a sensor and can be distinguished from each other so that the absolute rotation angle or phase position of the shaft can be determined. It is thus possible, for example, to arrange a marking of the second type at the start of each quadrant of the detector wheel such that the markings of the second type can be used to determine the quadrant in which the shaft is positioned.

The markings of the second type in a preferred embodiment consist of two tooth spaces between which a predefined number of teeth is arranged. The markings of the second type differ with respect of the number of teeth between the two tooth spaces. The evaluation unit for the rotation angle detector according to the invention thus checks constantly to see whether a tooth space is present, in order then to count the teeth and/or pulses until the next tooth space. The number of teeth between adjacent tooth spaces can then, for example, be allocated to a combustion chamber of an internal combustion engine, which combustion chamber is due for the next injection process.

The markings of the second type are preferably spread over the periphery of the detector wheel in an evenly spaced arrangement.

The rotation angle detector according to the invention described above may be used to drive an injection system. It is preferable here for one rotation angle detector to be provided for the camshaft and one rotation angle detector to be provided for the crankshaft, the number of pulses/teeth of the detector wheel for the camshaft preferably being an integer multiple of the number of pulses/teeth of the detector wheel for the crankshaft.

The invention also includes an operating method for an injection system of this type with the rotation angle detector according to the invention.

It should additionally be mentioned that the rotation angle detector according to the invention can also be used to drive the injection system of multicylinder internal combustion engines having, for example, 6, 8, 10 or 12 cylinders. It is possible here for the synchronization not to be effected directly at the reference mark, but rather to be offset in time from the latter. The synchronization may thus be effected, for example, a predefined number of teeth and/or pulses after the reference mark.

DETAILED DESCRIPTION OF THE PRESENTLY PREFERRED EMBODIMENTS

Figure 1:
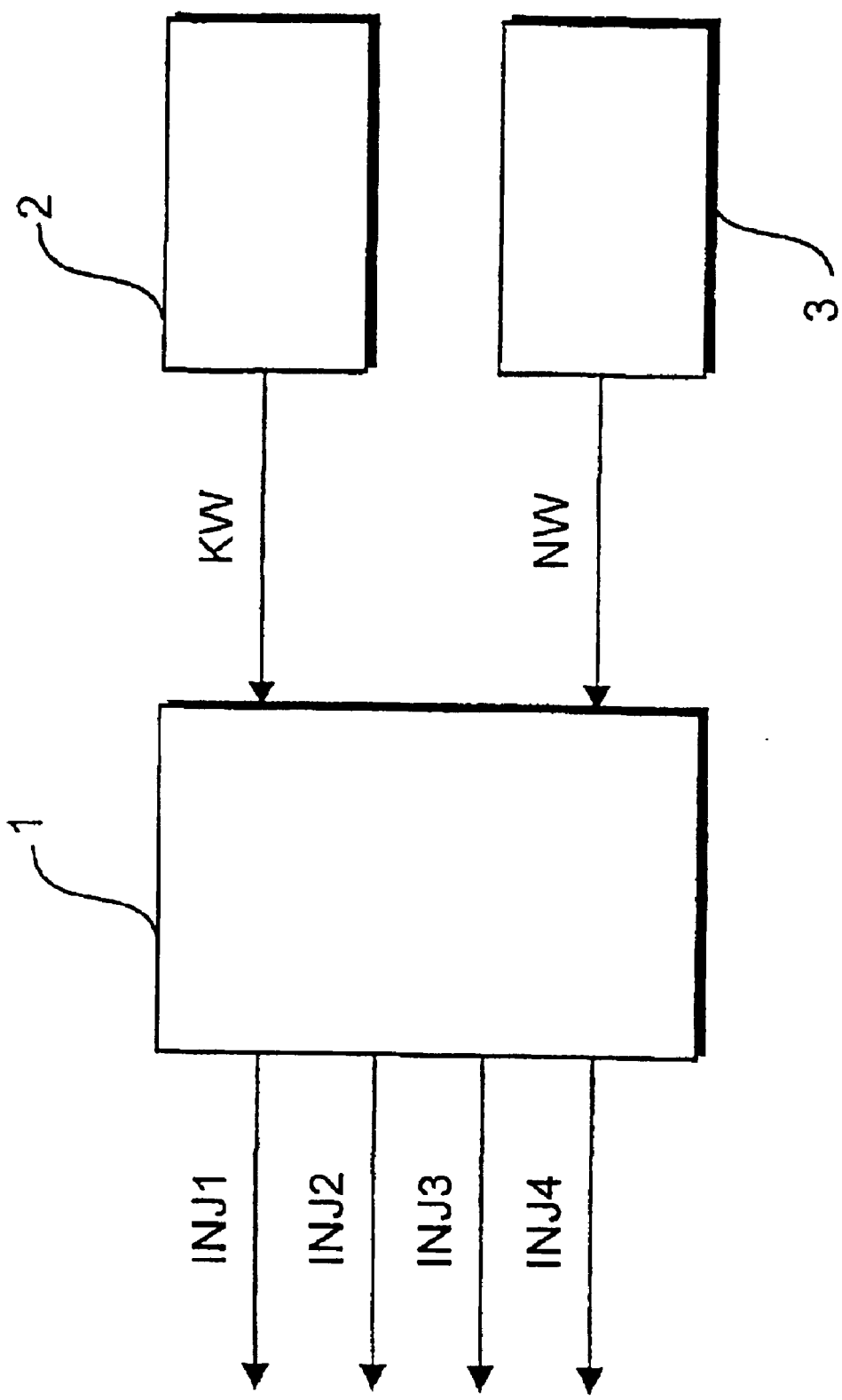
FIG. 1 is a block diagram of an injection system having a rotation angle detector according to the present invention.

The block diagram presented in FIG. 1 shows an injection system 1 for driving four injectors INJ1–INJ4. The injection system 1 is connected to a rotation angle detector 2 for the crankshaft and a rotation angle detector 3 for the camshaft.

Figure 2:
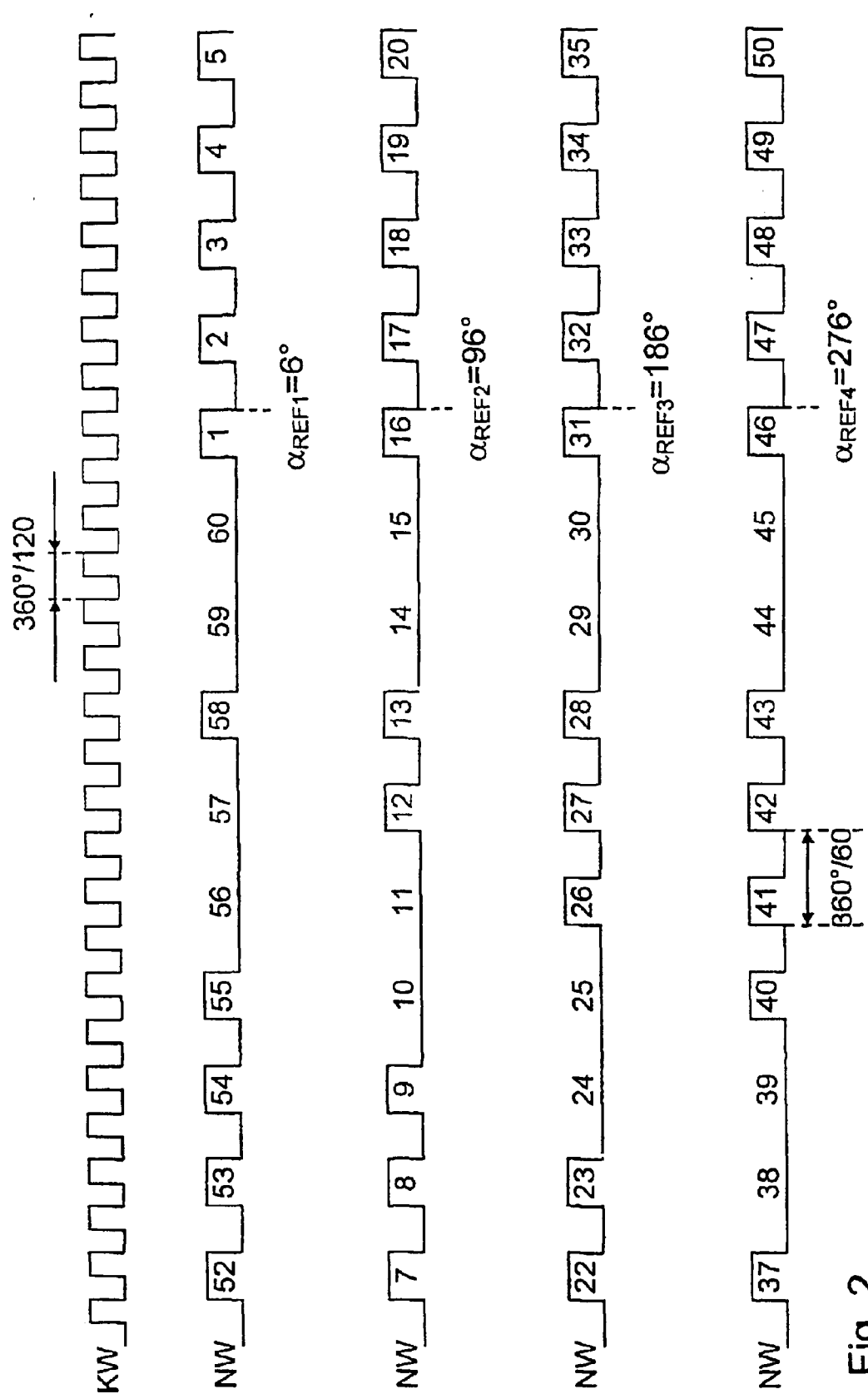
FIG. 2 is a pulse diagram of the rotation angle detector according to the present invention.

The rotation angle detector 2 for the crankshaft is of largely conventional design and is not therefore described in any greater detail below. The pulse train KW generated by the rotation angle detector 2 is, however, reproduced in the pulse diagram presented in FIG. 2. It can be seen from the pulse diagram that the rotation angle detector 2 for the crankshaft generates a continuous pulse train that enables only a relative determination of the rotation angle and that the phase position of the crankshaft is not apparent in the pulse train generated by the rotation angle detector 2.

Figure 3A:
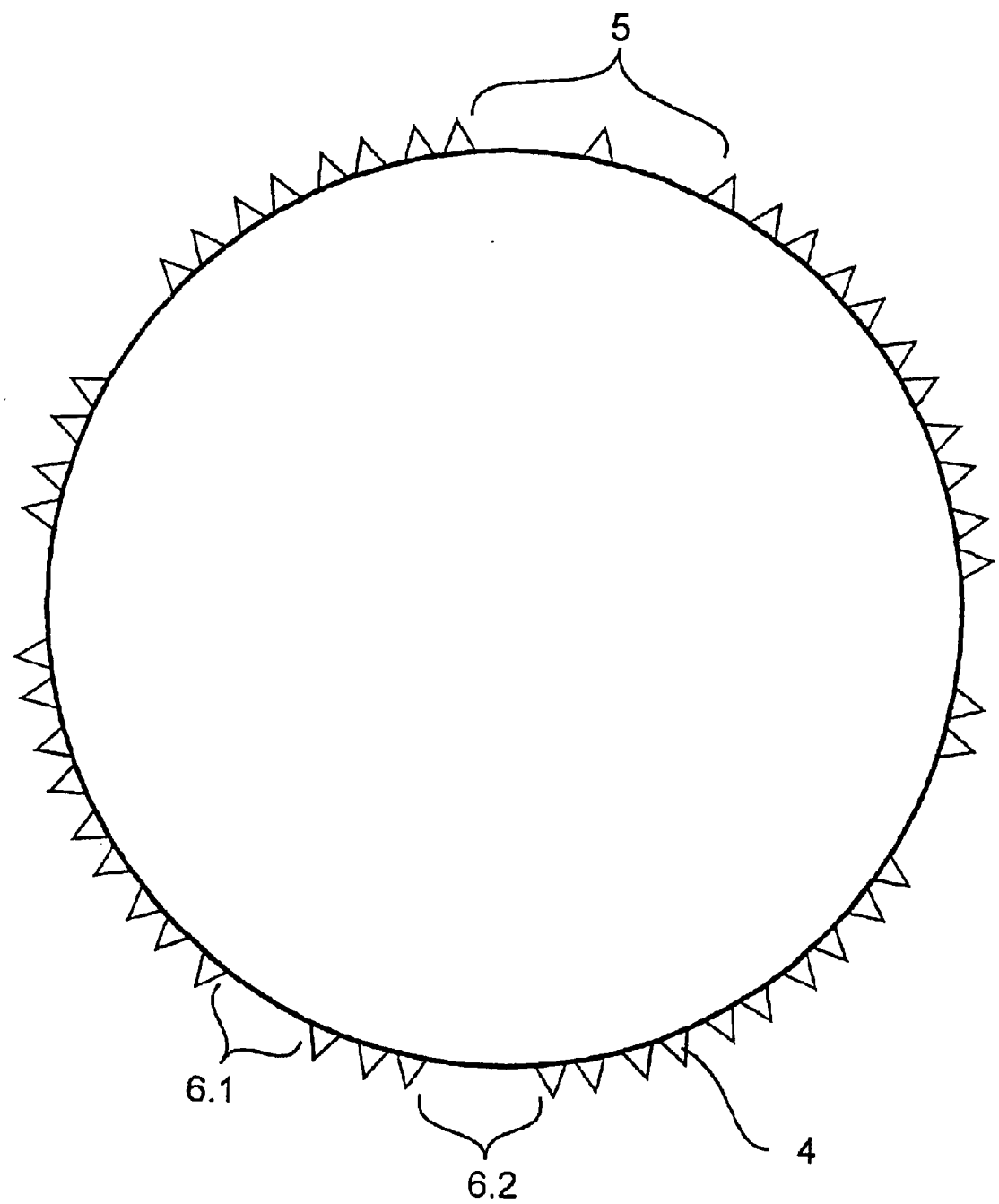
FIG. 3a is a schematic diagram of a detector wheel of the rotation angle detector according to the present invention.

The rotation angle detector 3 for the camshaft is, in contrast, of a special design as described below. The rotation angle detector 3 has a detector wheel realized as a toothed wheel and presented in FIG. 3a having a tooth pitch of 60 teeth, each tooth constituting a marking 4 of the first type, which marking enables a relative determination of the rotation angle.

The detector wheel of the rotation angle detector 3 has in addition four markings 5 of a second type, each of which comprises two tooth spaces 6.1, 6.2 between which a predefined number of teeth is arranged in each case. Each of the tooth spaces 6.1, 6.2 extend the space of at least two teeth. The number of teeth arranged between the tooth spaces 6.1, 6.2 here determines the number of the combustion chamber of the internal combustion engine due for an injection process.

The evaluation device for the rotation angle detector 3 arranged in the injection system 1 therefore counts the number of pulses and/or teeth 4 between one detected tooth space 6.1, 6.2 and the next detected tooth space. If the value determined lies between one and the number of combustion chambers in the internal combustion engine, the next pulse edge to occur is used as reference mark $\alpha_{REF}$ for the combustion chamber number corresponding to the number of teeth between the tooth spaces. If, on the other hand, the value of pulses determined in the counting process between the tooth spaces 6.1, 6.2 is greater than the number of combustion chambers, the marking is not a marking 5 of the second type and consequently no reference mark is generated.

The markings 5 of the second type described above advantageously enable a cylinder selection and/or a synchronization of the camshaft signal such that operation of the injection system remains possible even after a failure of the rotation angle detector 2 for the crankshaft.

Figure 3B:
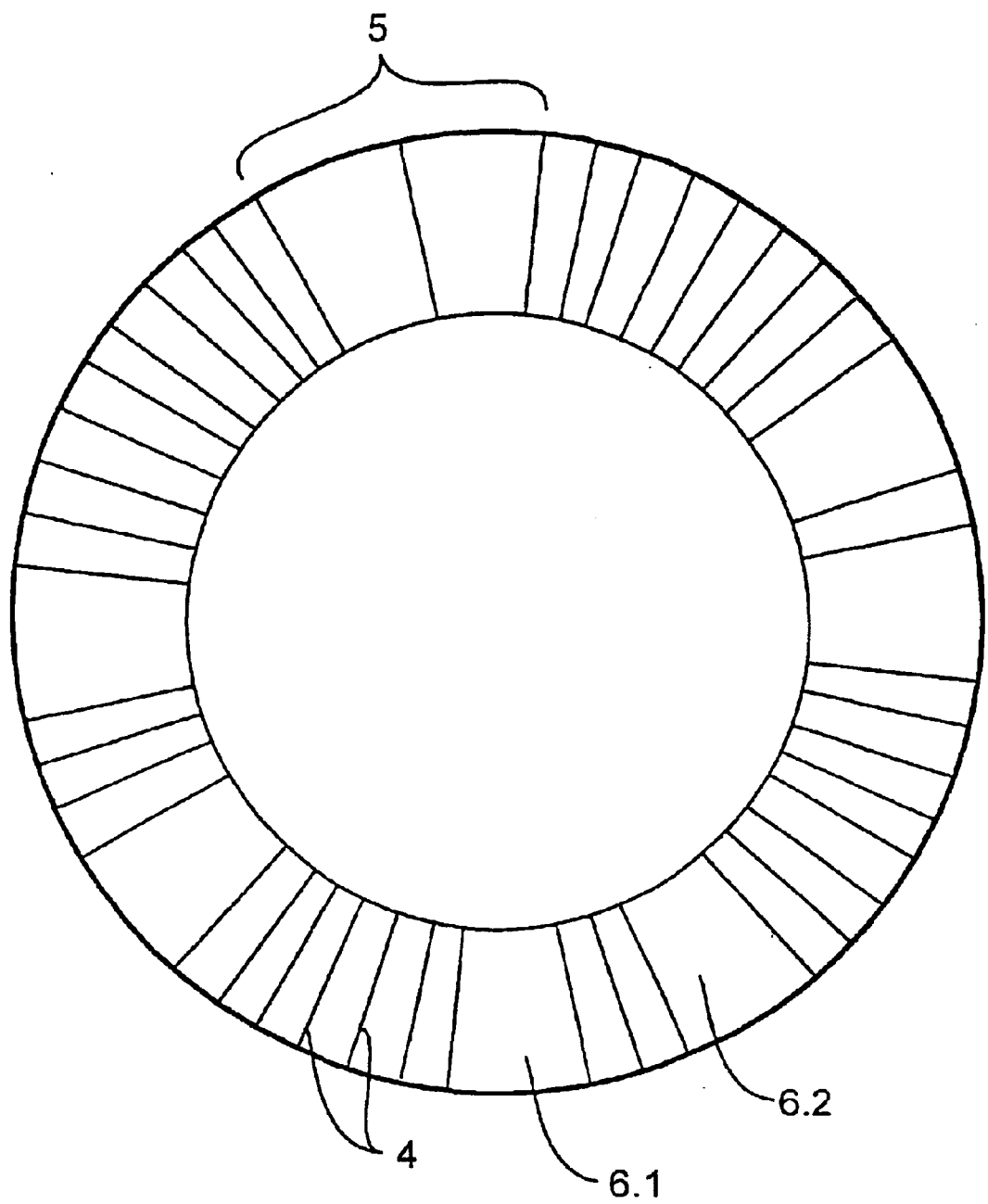
FIG. 3b is a schematic diagram of another detector wheel according to the present invention.

FIG. 3b shows an alternative embodiment of a detector wheel for the rotation angle detector 3 of the camshaft that largely coincides with the embodiment described above and shown in FIG. 3a, as a result of which the same reference numbers are used below and reference is made to the description above to avoid repetitions.

The special feature of the detector wheel according to FIG. 3b is that markings in the form of radial lines that can be sampled by an optical sensor are provided instead of teeth. Each of the individual radial lines here constitutes a marking 4 of the first type. Each of the markings 5 of the second type comprises two gaps 6.1, 6.2 with an angular extent of two lines between which a predefined number of radial lines are arranged. The number of radial lines between the two gaps 6.1, 6.2 indicates the number of the combustion chamber concerned.

The invention is not limited to the preferred embodiments described above. It is rather the case that there are a large number of conceivable variants and modifications that make use of the inventive idea and consequently also fall within the scope of protection.

What is claimed is:

1. A rotation angle detector for detecting an angular position of a shaft, comprising:
    a detector wheel mechanically connectable to the shaft for rotating with the shaft;
    first markings distributed over a periphery of said detector wheel, said first marking facilitating a determination of a relative rotation angle of said detector wheel;
    second markings distributed over the periphery of said detector wheel, said second markings facilitating determination of an absolute rotation angle of the detector wheel; and
    a detector for detecting said first markings and said second markings during rotation of said detector wheel, wherein each of said second markings is distinguishable from the others of said second markings such that the absolute rotation angle of the detector wheel is determinable in response to detection of only one of said second markings.

2. The rotation angle detector of claim 1, wherein said first markings are evenly spaced in subsections of said detector wheel.

3. The rotation angle detector of claim 1, wherein the shaft is part of an internal combustion machine having a plurality of combustion chambers, wherein the number of second markings is equal to the number of combustion chambers, and wherein each of said second markings is allocated to one of the combustions chambers.

4. The rotation angle detector of claim 1, wherein said detector wheel comprises a toothed wheel having a plurality of teeth along a circumference of said detector wheel and each of said first markings and said second markings comprise at least one tooth of said plurality of teeth.

5. The rotation angle detector of claim 4, wherein each of said second markings comprises two spaces along said circumference and a number of teeth between the two spaces, wherein said each of said second markings is distinguishable from the others of said second marking by the number of teeth between the two spaces.

6. The rotation angle detector of claim 5, wherein each of the two spaces extends along the circumference by a length at least equal to the extent of two teeth.

7. The rotation angle detector of claim 1, wherein said second markings are evenly distributed over the periphery of said detector wheel.

8. The rotation angle detector of claim 1, wherein the shaft is a camshaft of an internal combustion engine, said rotation angle detector further comprising a further detector wheel having a number of markings and mechanically connectable to the crankshaft of the internal combustion engine, wherein the number of said first markings is an integer multiple of the number of markings on the further detector wheel.

9. A combination including an injection system for an internal combustion engine and a rotation angle detector for detecting an angular position of a shaft, said injection system being responsive to said rotation angle detector, wherein said rotation angle detector comprises:
    a detector wheel mechanically connectable to the shaft for rotating with the shaft;
    first markings distributed over a periphery of said detector wheel, said first marking facilitating a determination of a relative rotation angle of said detector wheel;
    second markings distributed over the periphery of said detector wheel, said second markings facilitating determination of an absolute rotation angle of the detector wheel; and
    a detector for detecting said first markings and said second markings during rotation of said detector wheel, wherein each of said second markings is distinguishable from the others of said second markings such that the absolute rotation angle of the detector wheel is determinable in response to detection of only one of said second markings.

10. A method for operating an injection system of an internal combustion engine having a rotation angle detector for detecting an angular position of a shaft, the rotation angle detector having a detector wheel mechanically connectable to the shaft for rotating with the shaft, first markings distributed over a periphery of the detector wheel, the first marking facilitating a determination of a relative rotation angle of the detector wheel, second markings distributed over the periphery of the detector wheel, each of the second markings being distinguishable from the others of said second marking for facilitating determination of an absolute rotation angle of the detector wheel, and a detector for detecting the first markings and the second markings during rotation of the detector wheel, said method comprising the steps of:

- detecting the first markings during rotation of the shaft;
- defining the injection timing by the frequency of the detections of the first markings;
- detecting the second markings during rotation of the shaft and determining an absolute rotation angle of the detector wheel in response to detection of only one of the second markings;
- selecting a combustion chamber of the internal combustion engine for injecting fuel in response to the determination of said absolute rotation angle of the detector wheel; and
- injecting fuel into the selected combustion chamber using the timing determined by detection of the first markings.

11. The method of claim 10, further comprising the step of determining the absolute angle of rotation of the detector wheel in response to the detection of the second markings.

12. The method of claim 11, wherein said step of detecting the second markings comprises counting the number of fast markings between two successive spaces in the first markings and said step of selecting a combustion chamber comprises selecting the combustion chamber corresponding the counted number of first markings.

13. The method of claim 12, wherein said step of counting further comprises comparing the counted number of first markings between two successive spaces with the number of combustion chambers connected to the injection system, wherein said step of selecting a combustion chamber comprises selecting a combustion chamber only if the number of counted first markings is not greater than the number of combustion chambers connected to the injection system.

14. The method of claim 13, further comprising the step of adopting the next one of the first markings following the two successive spaces in the first markings as a reference angle for the selection of a combustion chamber.

15. The method of claim 12, further comprising the step of adopting the next one of the first markings following the two successive spaces in the first markings as a reference angle for the selection of a combustion chamber.

* * * * *

UNITED STATES PATENT AND TRADEMARK OFFICE
CERTIFICATE OF CORRECTION

| | |
|---|---|
| PATENT NO. | : 6,854,455 B2 |
| APPLICATION NO. | : 10/381943 |
| DATED | : February 15, 2005 |
| INVENTOR(S) | : Uwe Lingener |

It is certified that error appears in the above-identified patent and that said Letters Patent is hereby corrected as shown below:

Please add the following to the cover page of the above-identified patent:

--(30) Foreign Application Priority Data

September 28, 2000 (DE)   100 48 169.8--

Signed and Sealed this

Eighteenth Day of July, 2006

JON W. DUDAS
*Director of the United States Patent and Trademark Office*